(12) United States Patent
Pulleyblank et al.

(10) Patent No.: US 9,868,403 B2
(45) Date of Patent: Jan. 16, 2018

(54) VEHICLE STORAGE CONTAINER WITH MULTI-FUNCTION, MULTI-SEGMENT ARTICULATED DOOR ASSEMBLY

(71) Applicant: GM GLOBAL TECHNOLOGY OPERATIONS LLC, Detroit, MI (US)

(72) Inventors: Mark A. Pulleyblank, Harrison Township, MI (US); Randy S. Bugbee, Grand Blanc, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/139,016

(22) Filed: Apr. 26, 2016

(65) Prior Publication Data

US 2017/0305356 A1    Oct. 26, 2017

(51) Int. Cl.
*B60R 9/06* (2006.01)
*E06B 5/00* (2006.01)
*E05D 3/00* (2006.01)

(52) U.S. Cl.
CPC ............... *B60R 9/06* (2013.01); *E06B 5/00* (2013.01); *E05D 3/00* (2013.01); *E05Y 2900/544* (2013.01)

(58) Field of Classification Search
CPC .... B60R 9/06; E06B 5/00; E05D 3/00; E05Y 2900/544
See application file for complete search history.

(56) References Cited

U.S. PATENT DOCUMENTS

| | | | |
|---|---|---|---|
| 4,635,992 A | 1/1987 | Hamilton et al. | |
| 4,705,317 A * | 11/1987 | Henri | B62D 33/02 224/404 |
| 5,080,250 A | 1/1992 | Dickinson et al. | |
| 5,316,358 A | 5/1994 | Payne et al. | |
| 6,464,276 B1 * | 10/2002 | Gruich | B60R 9/00 224/402 |
| 8,087,713 B2 * | 1/2012 | Schrader | B60J 7/10 296/100.18 |
| 8,827,343 B2 | 9/2014 | Peters | |

OTHER PUBLICATIONS http://www.deezee.com/product_images/Wheel%20Well%20(Double).pdf; Accessed Apr. 27, 2016.

* cited by examiner

*Primary Examiner* — D Glenn Dayoan
*Assistant Examiner* — Melissa A Black
(74) *Attorney, Agent, or Firm* — Quinn IP Law

(57) ABSTRACT

Disclosed are vehicle storage containers, methods for making and methods for using vehicle storage containers, and motor vehicles with utility storage containers. Disclosed, for example, is a utility storage container for a motor vehicle. The utility storage container includes a container basin that attaches to the vehicle body and stows within the vehicle's cargo compartment. The container basin includes multiple sidewalls projecting from a base to cooperatively define a basin opening. An articulated door assembly includes a first door segment pivotably coupled to the container basin to transition the door assembly between a closed position, whereat the door segments cooperatively cover the basin opening, and a full-open position, whereat the door segments uncover the opening. A second door segment is pivotably coupled to the first door segment to transition the door assembly between the closed position and a half-open position, whereat the second door segment partially uncovers the basin opening.

20 Claims, 3 Drawing Sheets

VEHICLE STORAGE CONTAINER WITH MULTI-FUNCTION, MULTI-SEGMENT ARTICULATED DOOR ASSEMBLY

TECHNICAL FIELD

The present disclosure relates generally to storage containers for motor vehicles. More specifically, aspects of this disclosure relate to utility storage bins that mount within the rear cargo area of a pickup truck or other cargo transport vehicle.

BACKGROUND

Most conventional motor vehicles, such as the modern-day automobile, are originally equipped with a dedicated storage area next to the passenger compartment for stowing personal effects and belongings. A traditional trunk compartment, for example, is a large storage bin located at the rear of the vehicle and covered by a trunk lid that is hinged underneath the passenger compartment's rear deck. By comparison, the dedicated storage area of a pickup truck and other cargo transport vehicles (e.g., sport utility vehicles (SUV), cargo vans, box trucks, etc.) is typified by a rear cargo compartment that is closed off at the tail end by a hinged liftgate, tailgate or door assembly. Truck cargo compartments normally offer more storage volume than their conventional trunk counterparts by providing increased floor space with an elevated cargo ceiling (vans, SUVs, box trucks, etc.) or an open cargo area without a ceiling (pickups, flatbeds, etc.).

Pickup trucks and other cargo transport vehicles are frequently used as commercial work vehicles because the increased storage volume of the rear cargo compartment provides extra space for hauling oversize equipment, tools and trade supplies. The rear cargo compartment may also be customized with storage boxes, shelving, or racks to accommodate more specific storage needs. Most truck storage boxes are affixed to a forward portion of the cargo bed, e.g., adjacent the vehicle cab, or along the sidewalls of the cargo bed, e.g., adjacent a wheel well. Oftentimes fabricated from high-gauge, rust-resistant aluminum or steel, the basin of the storage box is bolted to the truck bed and covered by a single-ply lid that extends horizontally along the length of the container. Many truck bed storage boxes provide lockable lids that are mounted by two double-acting butt hinges to a sidewall of the basin.

SUMMARY

Disclosed herein are vehicle storage containers, methods for making and methods for using vehicle storage containers, and motor vehicles with a rear cargo compartment within which is mounted a utility storage container. By way of example, and not limitation, an improved full-bed-length, side-mounted storage bin with a unique multi-function, full-length articulated door is disclosed. The articulated door has two door segments that are interconnected by a flexible joint such that a single door segment can be independently opened to provide a smaller access opening or, when desired, both segments can be opened to provide a larger access opening. When opened, the single door segment can be supplemented with check straps and a reinforced panel to double as a horizontal work surface. Optional configurations allow the entire door assembly to be lowered to the bed surface and/or removed from the container basin. For increased structural integrity, the door segments can be joined by a piano hinge that extends along approximately the entire length of the articulated door. Some configurations shingle the door segments with the basin and each other for improved weatherproofing. Lockable latches may be provided to secure the two door segments to the basin.

Attendant benefits for at least some of the disclosed concepts include providing an enlarged access opening for loading/unloading objects of varying shapes and sizes into the storage basin. By way of example, the width of the enlarged access opening can be wider than the width of the basin (e.g., a ratio of approximately 1.15:1 to approximately 1.25:1). With this design, the utility storage container can receive through a basin opening in the side of the container objects with approximately the same width and height as the storage volume of the container. Rather than opening the entire door assembly, a single segment of the articulated door can be opened to allow for quick access to load/unload smaller or narrower objects from the storage bin. To minimize the amount of functional cargo bed space occupied by the utility storage container, the container basin can be mounted over a wheel well partially recessed into the truck bed sidewall. Some configurations allow the entire assembly to be readily mounted to and removable from the truck bed via a quick-release latching mechanism, which eliminates the need for retrofitting the bed with mounting brackets or other dedicated hardware historically required for securing conventional truck boxes.

Aspects of the present disclosure are directed to storage containers for motor vehicles, such as pickup trucks and other cargo transport vehicles. Disclosed, for example, is a utility storage container for a motor vehicle with a vehicle body having a cargo compartment. The utility storage container includes a container basin with an articulated door assembly. The container basin is configured to attach to the vehicle body and stow within the cargo compartment. The container basin includes a plurality of sidewalls projecting from a base to cooperatively define a storage volume with an opening. The articulated door assembly includes multiple interconnected door segments. A first door segment is pivotably coupled to the container basin to transition the articulated door assembly between a closed position, whereat the door segments cooperatively cover the basin opening, and a full-open position, whereat the door segments displace from and uncover the basin opening. A second door segment is pivotably coupled to the first door segment to transition the articulated door assembly between the closed position and a half-open position, whereat the second door segment displaces from and partially uncovers the basin opening while the first door segment partially extends across and covers the basin opening.

Other aspects of the present disclosure are directed to motor vehicles with one or more utility storage containers. A "motor vehicle," as used herein, may include any relevant vehicle platform, such as passenger vehicles (internal combustion engine (ICE), hybrid, electric, fuel cell, etc.), commercial vehicles, industrial vehicles, buses, all-terrain vehicles (ATV), farm equipment, etc. In one example, a motor vehicle is disclosed that includes a vehicle body with a rear cargo compartment aft of a passenger compartment. The rear cargo compartment may be enclosed, such as for vans, SUVs and box truck applications, or uncovered, such as for pickup truck and flatbed truck applications. The rear cargo compartment includes a cargo bed adjoined at an end thereof by a cargo sidewall. The cargo bed, which defines one or both rear wheel wells, cooperates with the cargo sidewall to define a cavity. A utility storage container is disposed in the rear cargo compartment, nested adjacent the cargo sidewall at least partially recessed into the cavity.

The utility storage container includes an elongated container basin that is attached to the cargo sidewall and seated on the cargo bed and wheel well. The container basin includes multiple sidewalls connecting a base with a roof to collectively define a storage volume with an opening. The utility storage container also includes an articulated door assembly with first and second elongated door segments. The first door segment is pivotably coupled to the container basin to transition the articulated door assembly between a closed position and a full-open position. The second door segment is pivotably coupled to the first door segment to transition the articulated door assembly between the closed position and a half-open position. When the articulated door assembly is in the closed position, the first and second door segments cooperatively cover the entire basin opening. When the articulated door assembly is in the half-open position, the first door segment covers a portion of the basin opening and the second door segment uncovers another portion of the basin opening. By comparison, when the articulated door assembly is in the full-open position, the first and second door segments both uncover the basin opening.

According to other aspects of the present disclosure, methods of making and methods of using vehicle storage containers are presented. For instance, a method of constructing a utility storage container for a motor vehicle is disclosed. The method includes: forming a container basin that attaches to the vehicle body and stows within the vehicle's cargo compartment, the container basin including a base and a plurality of sidewalls projecting from the base to cooperatively define a storage volume with an opening; forming first and second door segments of an articulated door assembly; pivotably coupling the first door segment to the container basin such that the articulated door assembly transitions between a closed position, whereat the door segments cooperatively cover the basin opening, and a full-open position, whereat the door segments uncover the basin opening; and, pivotably coupling the second door segment to the first door segment such that the articulated door assembly transitions between the closed position and a half-open position, whereat the second door segment partially uncovers the basin opening.

The above summary is not intended to represent every embodiment or every aspect of the present disclosure. Rather, the foregoing summary merely provides an exemplification of some of the novel aspects and features set forth herein. The above features and advantages, and other features and advantages of the present disclosure, will be readily apparent from the following detailed description of representative embodiments and modes for carrying out the present disclosure when taken in connection with the accompanying drawings and the appended claims.

Figure 1:
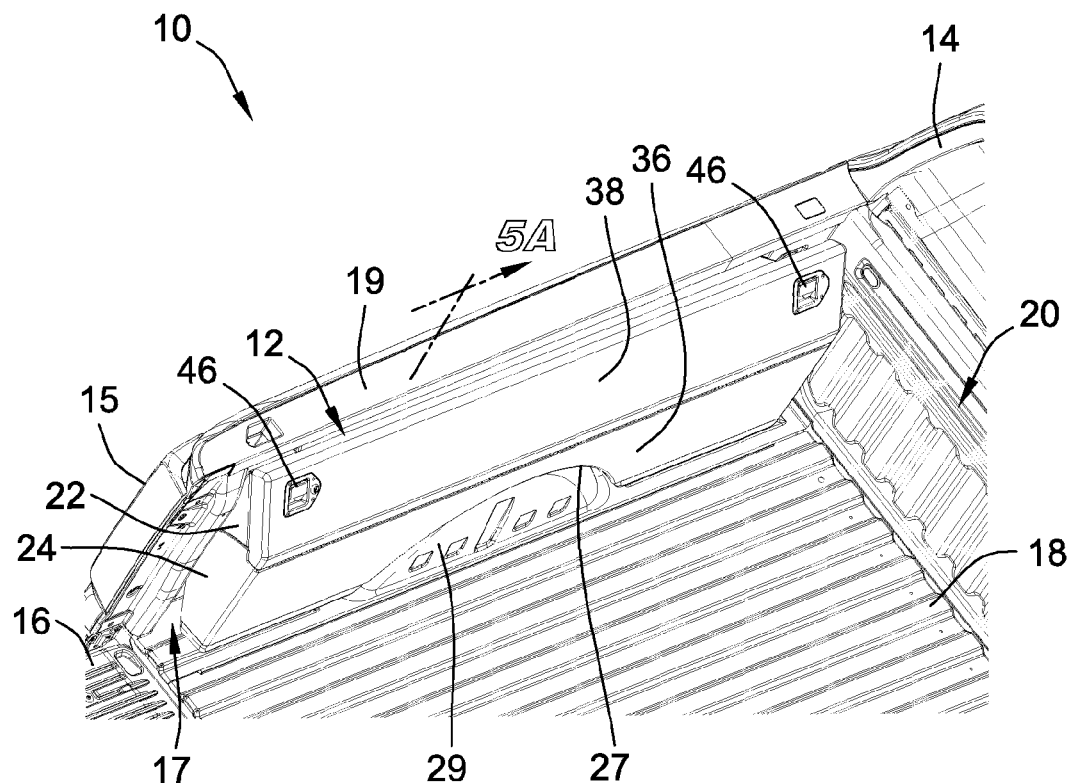
FIG. 1 is an elevated perspective-view illustration of a rear portion of a representative motor vehicle with a utility storage container in accordance with aspects of the present disclosure.

The present disclosure is susceptible to various modifications and alternative forms, and some representative embodiments have been shown by way of example in the drawings and will be described in detail herein. It should be understood, however, that the novel aspects of this disclosure are not limited to the particular forms disclosed. Rather, the disclosure is to cover all modifications, equivalents, combinations, subcombinations, and alternatives falling within the spirit and scope of the disclosure as defined by the appended claims.

DETAILED DESCRIPTION OF THE ILLUSTRATED EMBODIMENTS

This disclosure is susceptible of embodiment in many different forms. There are shown in the drawings and will herein be described in detail representative embodiments of the disclosure with the understanding that the present disclosure is to be considered as an exemplification of the principles of the disclosure and is not intended to limit the broad aspects of the disclosure to the embodiments illustrated. To that extent, elements and limitations that are disclosed, for example, in the Abstract, Summary, and Detailed Description sections, but not explicitly set forth in the claims, should not be incorporated into the claims, singly or collectively, by implication, inference or otherwise. For purposes of the present detailed description, unless specifically disclaimed: the singular includes the plural and vice versa; the words "and" and "or" shall be both conjunctive and disjunctive; the word "all" means "any and all"; the word "any" means "any and all"; and the words "including" and "comprising" and "having" mean "including without limitation." Moreover, words of approximation, such as "about," "almost," "substantially," "approximately," and the like, can be used herein in the sense of "at, near, or nearly at," or "within 3-5% of," or "within acceptable manufacturing tolerances," or any logical combination thereof, for example.

Referring now to the drawings, wherein like reference numbers refer to like features throughout the several views, there is shown in FIG. 1 a perspective-view illustration of a representative automobile, designated generally at 10, with a utility storage container, identified generally as 12. Mounted at a rearward portion of the automobile 10, e.g., aft of a passenger compartment 14 and forward of a tailgate 16, the utility storage container 12 is mounted on a cargo bed 18 within a rear cargo compartment 20. The illustrated automobile 10—also referred to herein as "motor vehicle" or "vehicle" for short—is merely an exemplary application with which the novel aspects of this disclosure can be practiced. In the same vein, the implementation of the present concepts into a longitudinally mounted truck box configuration should also be appreciated as an exemplary application of the novel concepts disclosed herein. As such, it will be understood that the aspects and features of the present disclosure can be integrated into other vehicle storage container assemblies and utilized for any type of motor vehicle. Lastly, the drawings presented herein, are not necessarily to scale and are provided purely for instructional purposes. Thus, the specific and relative dimensions shown in the drawings are not to be construed as limiting.

There is shown in FIG. 1 a representative vehicle-mounted utility storage container 12 (also referred to herein as "truck storage bin") for stowing and transporting, e.g., equipment, tools, supplies or any other items desired by the user. According to the illustrated example, the utility storage container 12 is generally constructed as a bipartite assembly composed of a multi-functional, multi-segment articulated door assembly 24 connected to an elongated side-access container basin 22. The utility storage container 12 can be constructed, for example, from a pressure-molded or blow-molded polymer, such as Polyethylene Terephthalate (PET), Polypropylene (PP), Polyvinyl Chloride (PVC), from 50-65 gauge smooth or tread plate aluminum or steel, combinations thereof, or any other material suitable for the intended application of the container. The illustrated utility storage container 12 is exemplified as a full-length, side-mount truck box designed to mount on either side of the cargo bed 18, e.g., extending substantially the entire length of the cargo bed 18. Optional variations can be modified to a desired half-length side box and/or mount transversely at a forward end of the cargo bed 18 as a saddle box. In this regard, it should be appreciated that the container 12 can take on any of an assortment of sizes, orientations, and geometries within the scope of this disclosure.

Figure 4:
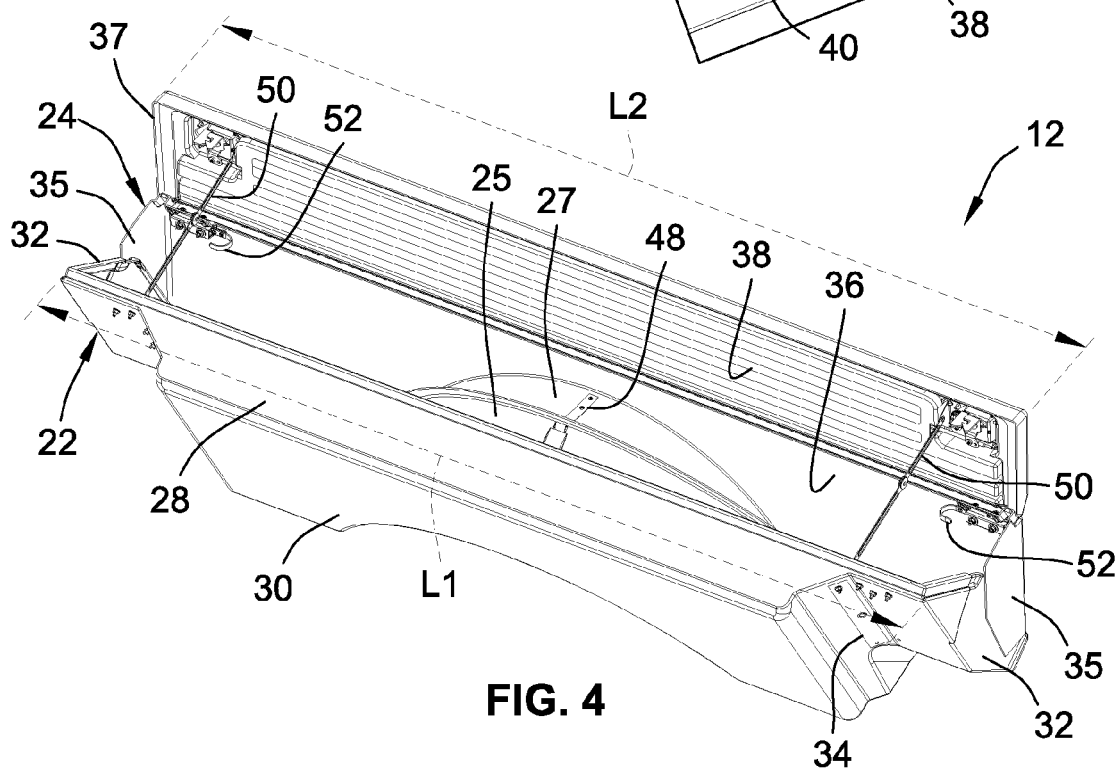
FIG. 4 is a backside perspective-view illustration of the utility storage container of FIG. 3 with the articulated door shown in the full-open position.
Figure 5A:
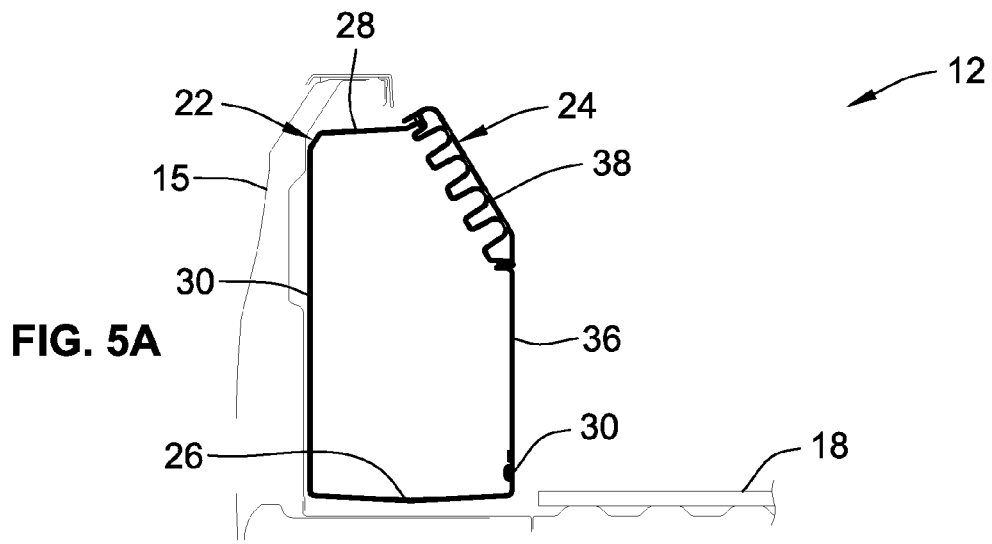
FIGS. 5A-5C are rear-view illustrations of a portion of the representative motor vehicle of FIG. 1, taken in cross-section along lines 5A-5A of FIG. 1, 5B-5B of FIG. 2, and 5C-5C of FIG. 3, respectively, to show the articulated door of the utility storage container in the closed, half-open, and full-open positions.
Figure 5B:
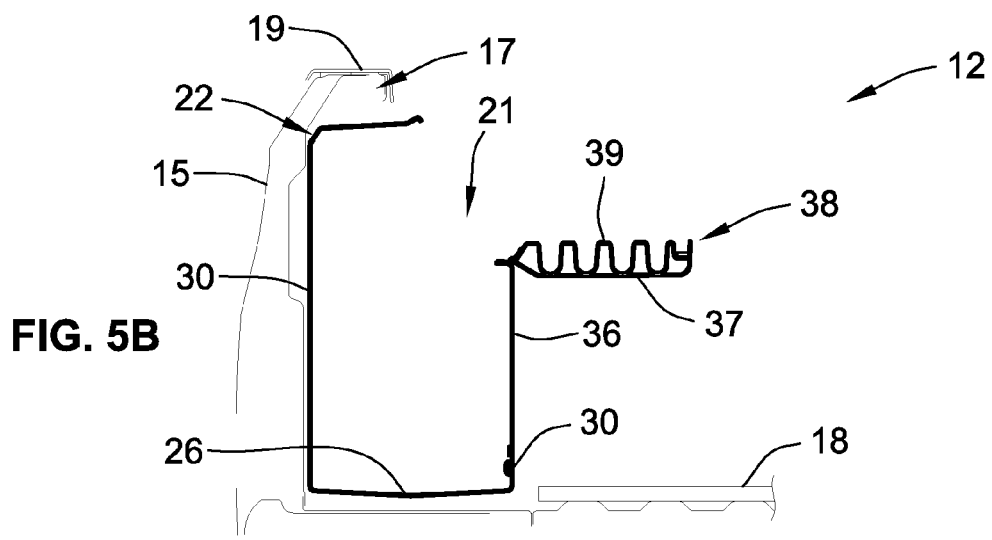
Figure 5C:
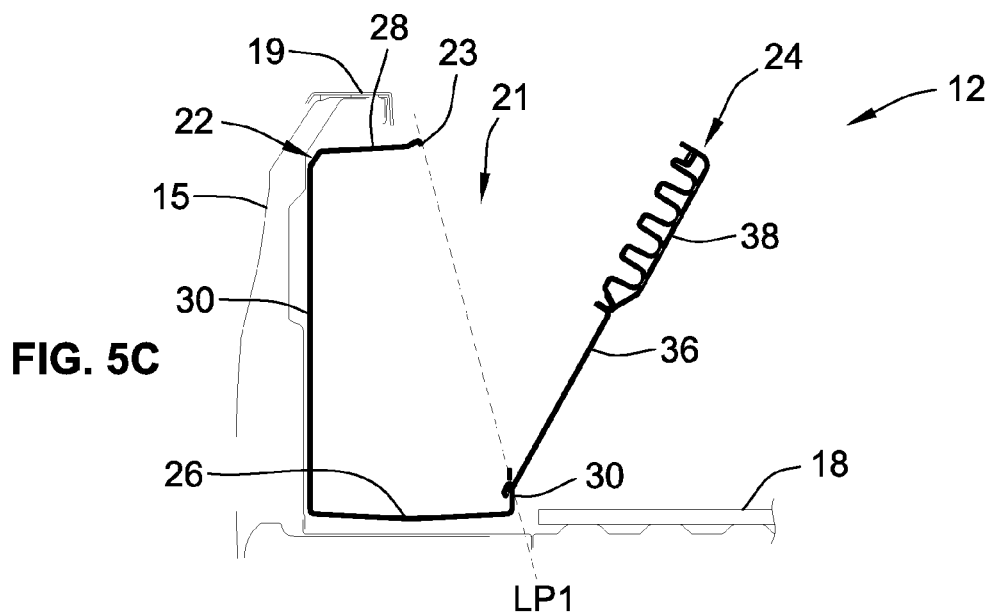

It is desirable, for at least some configurations, that the utility storage container 12 be designed to integrate to the internal geometry and cavities present in the rear cargo compartment 20 to minimize the amount of functional cargo space occupied by the utility storage container 12 and so as to not interfere with use of the tailgate 16 or aftermarket camper shells and tonneau bed covers. The container basin 22 includes an elongated base 26 in opposing spaced-relationship to an elongated roof 28, both of which can be seen in FIG. 5A oriented generally parallel to each other. Lateral and longitudinal planar sidewalls 30 and 32, respectively, project generally orthogonally from the base 26 such that the sidewalls 30, 32 structurally interconnect the base 26 and roof 28, as best seen with collective reference to FIGS. 4 and 5A. The base 26, roof 28 and sidewalls 30, 32 cooperatively define an internal storage volume, designated generally at 21, with a basin opening 23 (FIG. 5C). By way of non-limiting example, the illustrated utility storage container 12 provides at least approximately five (5) cubic feet of enclosed storage volume. To provide a side-access container, the basin opening 23 can be defined along a longitudinally oriented plane LP1 (FIG. 5C) that is obliquely angled with respect to the base 26 and roof 28.

Adjoining the lateral ends of the cargo bed 18 are opposing cargo sidewalls, labelled at 15 in FIG. 1 (only one of which can be seen in the drawings; a mirror counterpart is disposed at the opposite end of the bed). The cargo bed 18 and cargo sidewall 15, including sidewall overhang 19, cooperatively define a cavity 17 (FIG. 1) into which is nested a portion of the container basin 22, as best seen in FIG. 5B. Once properly seated, the elongated container basin 22 is mechanically attached to the cargo sidewall 15, e.g., via one or more quick-release latching mechanisms 34. To accommodate the foregoing positioning of the utility storage container 12, the base 26 of the container basin 22 incorporates an integrally formed arcuate well cap 25 (FIGS. 3 and 4) that is disposed between the basin sidewalls 30, 32 and shaped to nest therein a wheel well 29 of the cargo bed 18. The articulated door assembly 24 is provided with a complementary arcuate well cap 27 that is similar in shape and size with the basin's well cap 27 to extend around and partially circumscribe the wheel well 29. The door's well cap 25 fits generally flush within the basin's well cap 27 such that the base 26 contemporaneously seats on the cargo bed 18 and wheel well 29 for subjacent support of the utility storage container 12.

With reference to FIGS. 1-4, the articulated door assembly 24 is composed of multiple door segments, such as first and second door segments 36 and 38, respectively, that are interconnected to each other and to the container basin 22 by one or more flexible joints. By way of example, and not limitation, the first door segment 36, which is an elongated component terminating at opposing ends with orthogonal flanges 35 to define a generally U-shaped cross-section, extends longitudinally along the length L1 of the container basin 22. Likewise, the second door segment 38, which is an elongated, generally rectangular component with round-chamfered edges defining a lip 37, also extends longitudinally along the length L1 of the container basin 22 generally parallel to the first door segment 36. According to the example illustrated in FIG. 4, the door length L2 of the articulated door assembly 24 is approximately equal to or greater than the basin length L1 of the container basin 22. It is envisioned that the articulated door assembly 24 can be modified to incorporate greater than two door segments, with each segment taking on a form that is similar to or different from each other and from those illustrated in the drawings. Moreover, the overall length and height of the articulated door assembly 24 can be varied from that which is shown in the drawings.

Figure 2:
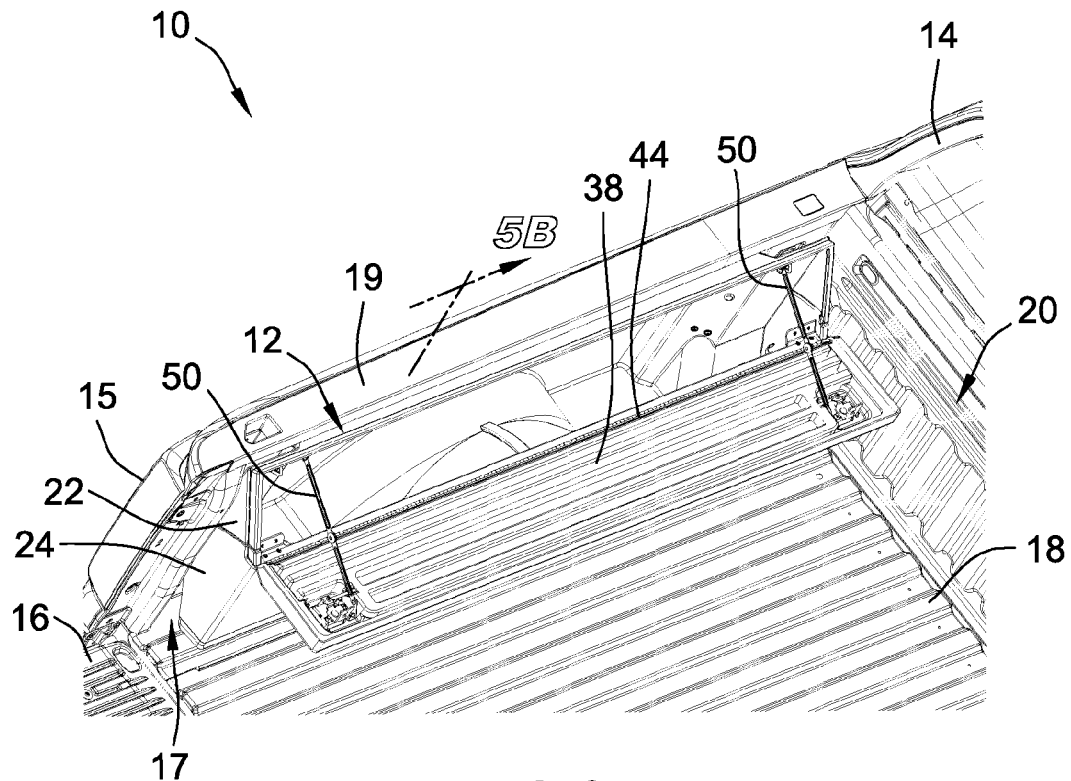
FIG. 2 is another perspective-view illustration of the representative motor vehicle of FIG. 1, showing the articulated door of the utility storage container in a half-open position.

To provide relative movement between the articulated door assembly 24 and the container basin 22, the first door segment 36 is pivotably coupled to the container basin 22, e.g., via a hinge joint. As can be seen in the inset view of FIG. 3, the hinge joint may comprise longitudinally spaced L-shaped tabs 40 that project from the lower edge of the first door segment 36 into complementary receiving slots 42 in the container basin 22. To provide relative movement between the door segments, the second door segment 38 is pivotably coupled to the first door segment 36 via a piano hinge 44 that extends substantially continuously along approximately the entire length of the articulated door assembly 24, as seen in FIG. 2. While various means of interconnecting the door segments with each other and with the basin are shown in the drawings, it should be appreciated that other mechanical linkages, such as butt hinges, barrel hinges, ball-and-socket joints, bearing assemblies, etc., can be utilized in any combination to join together the moving components of the utility storage container 12.

Figure 3:
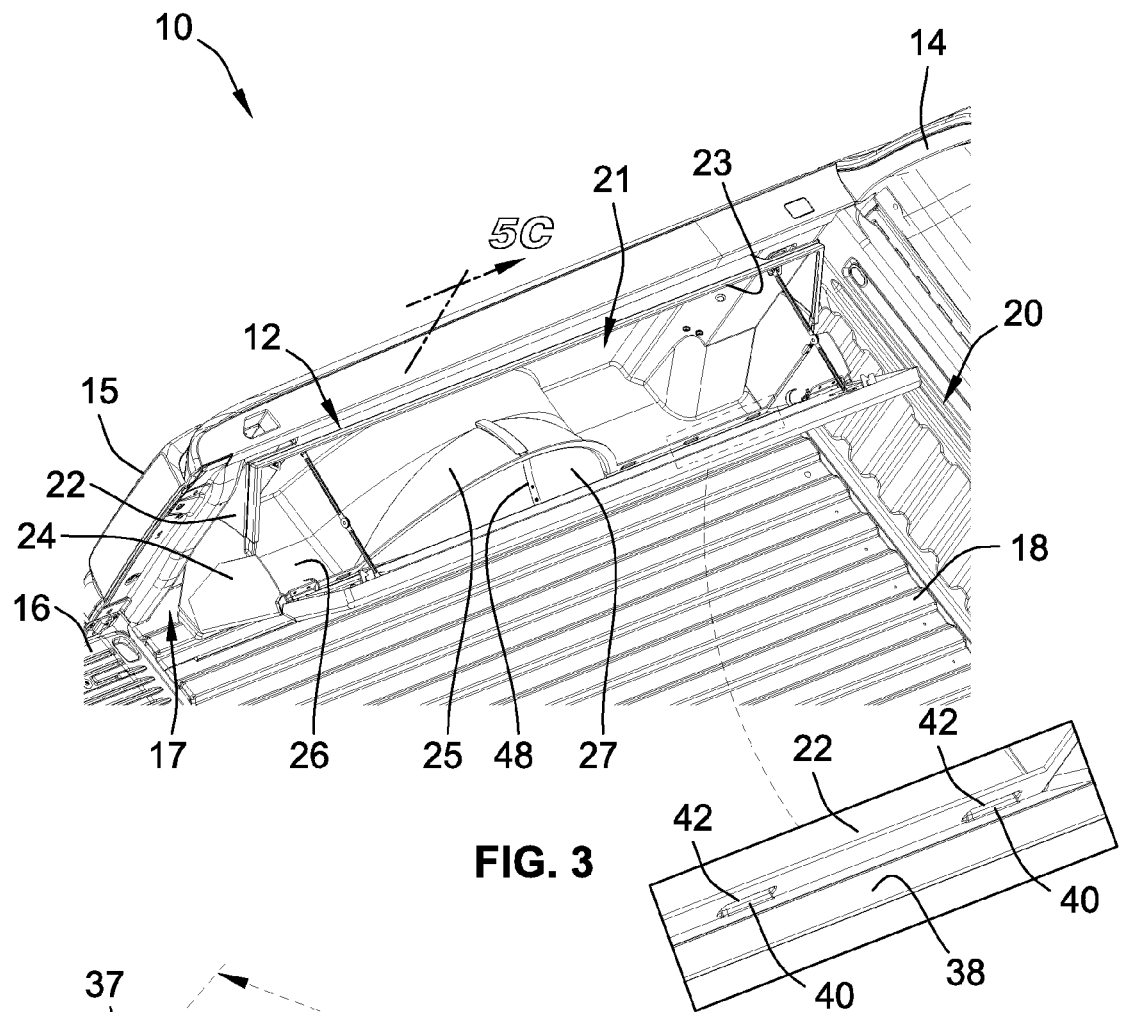
FIG. 3 is yet another perspective-view illustration of the representative motor vehicle of FIG. 1, showing the articulated door of the utility storage container in a full-open position.

To enable quick and simplified access to the internal storage volume 21 of the utility storage container 12, the articulated door assembly 24 is designed to allow a single door segment to be independently opened to thereby provide a smaller access opening (FIG. 2) and, when desired, to allow multiple door segments to be opened to thereby provide a larger access opening (FIG. 3). Turning to FIGS. 5A-5C, for example, the articulated door assembly 24 can be placed in a closed position (FIG. 5A), whereat the first and second door segments 36, 38 extend across, obstruct or otherwise cooperatively cover the basin opening 23. Lockable flush-mounted paddle latches 46 may be provided to rigidly secure the two door segments 36, 38 to the basin 22 and thereby retain the door assembly 24 in the closed position. For instances when a user desires to insert/remove a smaller or narrower object to/from the internal storage volume 21, for example, the articulated door assembly 24 can be transitioned from the closed position (FIG. 5A) to a half-open position (FIG. 5B). In particular, the second door segment 38 is independently pivoted about flexible joint 44 away from the roof 28 of the container basin 22 (e.g., clockwise in FIG. 5B) to uncover and expose a first (top) portion of the basin opening 23. When the door assembly 24 is "half-open," the first door segment 36 remains in a closed position to cover a lower portion of the basin opening 23, as best seen in FIGS. 2 and 5B.

When a user desires to insert/remove a larger or wider object to/from the internal storage volume 21 of the container 12, for example, the articulated door assembly 24 can be transitioned from the closed position (FIG. 5A) or the half-open position (FIG. 5B) to a full-open position (FIG. 5C). By simultaneously or sequentially pivoting both door segments 36, 38 about the flexible joint 40, 42 away from the container (e.g., clockwise in FIGS. 5A-5C), the first and second door segments 36, 38 expose or otherwise uncover the upper and lower portions of the basin opening 23. For at least some embodiments, the larger access opening shown in FIGS. 3 and 5C is at least approximately 50% wider from top-to-bottom than the smaller access opening, which is shown in FIGS. 2 and 5B. Optionally, the hinge joint 40, 42 releasably connects the first door segment 36 and, thus, the entire door assembly 24 to the container basin 22 such that the articulated door assembly 24 is selectively detachable from container basin 22. Detaching and removing the door assembly 24 in this manner will allow for unobstructed access to the entire basin opening 23.

In addition to providing secure storage functionality, the utility storage container 12 can also provide other functionalities for the user. Turning back to FIGS. 2 and 5B, for example, the articulated door assembly 24 can be selectively placed in the half-open position such that the second door segment 38 presents the user with a horizontal work surface. As shown in FIG. 5B, the second door segment 38 includes an outer (fascia) panel 37 that is reinforced with a ribbed inner panel 39 that defines a secure surface that is generally parallel to the cargo bed 18. The articulated door assembly 24 can also be configured to shingle or otherwise overlap the various door segments 36, 38 with the container basin 22 and with each other for improved weatherproofing functionality. The first door segment 36, for example, includes first and second flanges 35 projecting orthogonally from longitudinal ends thereof, whereas the second door segment 38 includes a lip 37 that projects orthogonally from a perimeter thereof. When in the closed position (FIG. 1), opposing ends of the lip 37 overlap the tops of the flanges 35 while the flanges 35 and lip 37 cooperatively overlap the perimeter of the basin opening 23, e.g., to prevent unwanted ingress of water, snow, dust and debris.

According to aspects of the disclosed concepts, the representative utility storage container 12 is constructed with various mechanisms to control rotation of the multi-segment articulated door assembly 24. A first (slot-type) check strap 48 mechanically couples the first door segment 36 to the container basin 22. The first check strap 48 limits rotation of the first door segment 36 and, thus, the entire door assembly 24 to a first pivot range (e.g., approximately 30-35 degrees of clockwise rotation in FIG. 5C). By way of comparison, one or more second (locking-joint) check straps 50 mechanically couples the second door segment 38 to the container basin 22. The check strap arrangement limits rotation of the second door segment 38 to a second pivot range (e.g., approximately 100-115 degrees of clockwise rotation in FIG. 5B). A first latching mechanisms, which may comprise first and second slam latches 52 of FIG. 4, project from an inside surface of the first door segment 36 and operate to releasably secure the door segment 36 to the container basin. Comparatively, a second latching mechanism, which may comprise paddle latches 46 of FIG. 1, are disposed at longitudinal ends of the second door segment 38 and operate to releasably secure door assembly 24 to the container basin 22. It is envisioned that the door assembly be constructed with additional or alternative means for limiting rotation of the various door segments and/or for rigidly securing the door segments to the basin.

While aspects of the present disclosure have been described in detail with reference to the illustrated embodiments, those skilled in the art will recognize that many changes may be made thereto without departing from the scope of the present disclosure. The present disclosure is not limited to the precise construction and compositions disclosed herein; any and all modifications, changes, and variations apparent from the foregoing descriptions are within the spirit and scope of the disclosure as defined in the appended claims. Moreover, the present concepts expressly include any and all combinations and subcombinations of the preceding elements and features.

What is claimed:

1. A utility storage container for a motor vehicle with a vehicle body including a cargo compartment, the utility storage container comprising:
    a container basin configured to attach to the vehicle body and stow within the cargo compartment, the container basin including a base and a plurality of sidewalls projecting from the base to cooperatively define a storage volume with an opening; and
    an articulated door assembly with first and second door segments, the first door segment being pivotably coupled to the container basin to transition the articulated door assembly between a closed position, whereat the first and second door segments cooperatively cover the basin opening, and a full-open position, whereat the first and second door segments uncover the basin opening, and the second door segment being pivotably coupled to the first door segment to transition the articulated door assembly between the closed position and a half-open position, whereat the second door segment partially uncovers the basin opening,
    wherein the second door segment defines a horizontal work surface when the articulated door assembly is in the half-open position.

2. The utility storage container of claim 1, wherein the container basin is elongated with a basin length, and wherein the articulated door assembly is elongated with a door length approximately equal to or greater than the basin length.

3. The utility storage container of claim 1, wherein the first door segment is pivotably coupled to the container basin via a hinge joint.

4. The utility storage container of claim 1, wherein the second door segment is pivotably coupled to the first door segment via a piano hinge.

5. The utility storage container of claim 1, wherein the cargo compartment includes a cargo bed with a wheel well, and wherein the base of the container basin is configured to seat on the cargo bed and extend around the wheel well.

6. The utility storage container of claim 1, wherein the first and second door segments each includes respective flanged surfaces at longitudinal ends thereof, the flanged surfaces each overlapping a respective one of the basin sidewalls when the articulated door assembly is in the closed position.

7. The utility storage container of claim 1, wherein the second door segment includes an outer panel reinforced with a ribbed inner panel that defines the horizontal work surface.

8. The utility storage container of claim 1, further comprising a first check strap connecting the first door segment to the container basin, the first check strap restricting rotation of the articulated door assembly to a first pivot range.

9. The utility storage container of claim 8, further comprising a second check strap connecting the second door segment to the container basin, the second check strap limiting rotation of the second door segment to a second pivot range distinct from the first pivot range.

10. The utility storage container of claim 1, further comprising a first latching mechanism releasably securing the first door segment to the container basin.

11. The utility storage container of claim 10, further comprising a second latching mechanism releasably securing the second door segment to the container basin.

12. The utility storage container of claim 1, wherein the container basin includes a roof connected to the base by the sidewalls, and wherein the basin opening is defined along a plane obliquely angled with the roof and the base.

13. The utility storage container of claim 1, wherein the articulated door assembly includes a lip projecting from a perimeter of the first and second door segments, the lip overlapping a perimeter of the basin opening when the articulated door assembly is in the closed position.

14. The utility storage container of claim 1, wherein the first door segment is releasably hinged to the container basin such that the articulated door assembly is selectively detachable from container basin.

15. A motor vehicle, comprising:
a vehicle body with a rear cargo compartment aft of a passenger compartment, the rear cargo compartment including a cargo bed adjoined at an end thereof by a cargo sidewall, the cargo bed defining a wheel well and cooperating with the cargo sidewall to define a cavity; and
a utility storage container disposed in the rear cargo compartment adjacent the cargo sidewall at least partially recessed into the cavity, the utility storage container comprising:
an elongated container basin attached to the cargo sidewall and seated on the cargo bed and wheel well, the container basin including a base, a roof, and a plurality of sidewalls connecting the base with the roof to collectively define a storage volume with an opening; and
an articulated door assembly with first and second elongated door segments, the first door segment being pivotably coupled to the container basin to transition the articulated door assembly between a closed position and a full-open position, and the second door segment being pivotably coupled to the first door segment to transition the articulated door assembly between the closed position and a half-open position,
wherein the first and second door segments cooperatively cover the basin opening when the articulated door assembly is in the closed position,
wherein the first door segment partially covers the basin opening while the second door segment partially uncovers the basin opening and defines a horizontal work surface when the articulated door assembly is in the half-open position, and
wherein the first and second door segments uncover the basin opening when the articulated door assembly is in the full-open position.

16. A method of constructing a utility storage container for a motor vehicle with a vehicle body including a cargo compartment, the method comprising:
forming a container basin configured to attach to the vehicle body and stow within the cargo compartment, the container basin including a base and a plurality of sidewalls projecting from the base to cooperatively define a storage volume with an opening;
forming first and second door segments of an articulated door assembly;
pivotably coupling the first door segment to the container basin such that the articulated door assembly transitions between a closed position, whereat the first and second door segments cooperatively cover the basin opening, and a full-open position, whereat the first and second door segments uncover the basin opening; and
pivotably coupling the second door segment to the first door segment such that the articulated door assembly transitions between the closed position and a half-open position, whereat the second door segment partially uncovers the basin opening and defines a horizontal work surface.

17. The method of claim 16, wherein the cargo compartment includes a cargo bed with a wheel well, and wherein the base of the container basin is formed to seat on the cargo bed and extend around the wheel well.

18. The method of claim 16, further comprising:
connecting the first door segment to the container basin with a first check strap, the first check strap restricting rotation of the articulated door assembly to a first pivot range; and
connecting the second door segment to the container basin with a second check strap, the second check strap limiting rotation of the second door segment to a second pivot range distinct from the first pivot range.

19. The method of claim 16, further comprising:
releasably securing the first door segment to the container basin with a first latching mechanism; and
releasably securing the second door segment to the container basin with a second latching mechanism.

20. The method of claim 16, wherein the container basin includes a roof connected to the base by the sidewalls, and wherein the basin opening is defined along a plane obliquely angled with the roof and the base.

\* \* \* \* \*